US011333213B2

(12) United States Patent
Hesse et al.

(10) Patent No.: US 11,333,213 B2
(45) Date of Patent: May 17, 2022

(54) WET RUNNING FRICTION LINING

(71) Applicant: Schaeffler Technologies AG & Co. KG, Herzogenaurach (DE)

(72) Inventors: Markus Hesse, Pfinztal (DE); Stefan Steinmetz, Gruenstadt (DE); Juergen Efing, Dortmund (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 988 days.

(21) Appl. No.: 15/779,708

(22) PCT Filed: Nov. 20, 2016

(86) PCT No.: PCT/DE2016/200533
§ 371 (c)(1),
(2) Date: May 29, 2018

(87) PCT Pub. No.: WO2017/092747
PCT Pub. Date: Jun. 8, 2017

(65) Prior Publication Data
US 2020/0300322 A1 Sep. 24, 2020

(30) Foreign Application Priority Data
Dec. 1, 2015 (DE) .......................... 102015223898.8

(51) Int. Cl.
*B32B 27/20* (2006.01)
*F16D 69/02* (2006.01)
*F16D 13/72* (2006.01)
*F16D 13/74* (2006.01)
*F16D 69/00* (2006.01)

(52) U.S. Cl.
CPC .............. *F16D 69/02* (2013.01); *B32B 27/20* (2013.01); *F16D 13/72* (2013.01); *F16D 13/74* (2013.01); *F16D 69/023* (2013.01); *B32B 2262/106* (2013.01); *B32B 2264/107* (2013.01); *B32B 2475/00* (2013.01); *F16D 2069/005* (2013.01); *F16D 2069/008* (2013.01); *F16D 2069/009* (2013.01)

(58) Field of Classification Search
CPC ................................................ F16D 2069/005
See application file for complete search history.

(56) References Cited

U.S. PATENT DOCUMENTS

| 2,702,770 | A | 2/1955 | Steck et al. |
| 6,194,059 | B1* | 2/2001 | Yesnik ................. F16D 69/026 |
| | | | 428/218 |
| 2005/0075414 | A1 | 4/2005 | Lam et al. |
| 2007/0010651 | A1* | 1/2007 | Finch ................. C08L 2666/36 |
| | | | 528/310 |
| 2007/0219289 | A1 | 9/2007 | Phipps et al. |
| 2014/0242405 | A1 | 8/2014 | Palumbo et al. |

FOREIGN PATENT DOCUMENTS

| CN | 1603379 A | 4/2004 |
| CN | 102002883 | 10/2012 |
| CN | 103133578 | 6/2013 |
| CN | 103453058 | 12/2013 |
| DE | 102010021722 | 12/2010 |
| DE | 102012219303 | 5/2013 |
| GB | 1604827 A | 12/1981 |
| JP | S60044530 A | 3/1985 |
| JP | H0288678 | 3/1990 |
| JP | H02088678 A | 3/1990 |
| JP | H05222353 A | 8/1993 |
| JP | H09194822 A | 7/1997 |
| JP | 2000088020 A | 3/2000 |
| JP | 2007100933 A | 4/2007 |
| JP | 2009173754 A | 8/2009 |

OTHER PUBLICATIONS

See International Search Report of PCT/DE2016/200533, dated Feb. 7, 2017 (in English).

* cited by examiner

*Primary Examiner* — William P Watkins, III
(74) *Attorney, Agent, or Firm* — Davidson, Davidson & Kappel, LLC

(57) ABSTRACT

A wet running friction lining includes a plastic matrix, which contains at least one filler. The wet running friction lining contains bentonite as a filler.

13 Claims, 1 Drawing Sheet

WET RUNNING FRICTION LINING

The disclosure relates to a wet running friction lining with a plastics matrix, which contains at least one filler.

BACKGROUND

German Laid-Open Application DE 10 2012 219 303 A1 discloses a friction lining and/or sliding liner with a plastics matrix, which contains graphite as a filler. German Laid-Open Application DE 10 2010 021 722 A1 discloses a method for producing a friction lining for friction clutches in a motor vehicle, wherein a dispersion of water and solids is sucked onto a screen-type surface and the solids are deposited on the screen-type surface, wherein the screen-type surface is embodied in the form of a three-dimensional structure, wherein the solids fraction of the constituents of the friction material which are added during the production of the friction lining contains thirty five to eighty percent by weight of cotton fibers, one to ten percent by weight of aramid fibers, one to forty percent by weight of silicon dioxide, five to thirty percent by weight of phenolic resin and customary processing adjuvants for paper production.

SUMMARY OF THE INVENTION

It is an object of the disclosure to simplify and/or improve the production and/or functionality of wet running friction linings with a plastics matrix, which contains at least one filler.

This object may be achieved, in the case of a wet running friction lining with a plastics matrix, which contains at least one filler, if the wet running friction lining contains bentonite as a filler. The wet running friction lining is formed from a friction lining material which preferably contains a plurality of layers. The friction lining material preferably comprises at least one bottom layer, which is also referred to as an underlayer, and at least one top layer, which is also referred to as an overlayer. The wet running friction lining is preferably embodied as a paper lining. Conventional friction lining formulations contain kieselguhr as a filler, for example. The morphology, grain size distribution, treatment and also the extraction site of these kieselguhrs can affect the characteristic of the friction behavior, in particular the friction coefficient, over a differential speed during the operation of the wet running friction lining. In tests and studies carried out in the context of the present disclosure, it has been found that a significant increase in the friction coefficient level and static friction coefficient with continued positive friction coefficient gradients over the differential speed can be achieved through the use of bentonite. Here, the filler bentonite can either completely or partially replace a conventional filler. The filler bentonite can advantageously be used in single- or, alternatively, multi-layer friction papers in various layers. The bentonite is a clay material, which, as a sheet silicate, has a flaky structure. The wet running friction lining with the bentonite as a filler is very well-suited, for example, to use in dual clutch transmissions. However, the friction lining material with the filler bentonite is also very good for use in the following applications: torque converters, automatic transmissions, lockup clutches, dual clutches, synchronization and other wet running friction applications. "Wet running" means that the wet running friction lining comes into contact with a liquid lubricant and/or coolant, such as oil, during operation.

A preferred illustrative embodiment of the wet running friction lining is characterized in that the wet running friction lining contains bentonite as the only filler. The bentonite used as a filler is, for example, a white powder with a bulk density of about one hundred and forty four grams per liter.

Another preferred illustrative embodiment of the wet running friction lining is characterized in that the wet running friction lining contains bentonite as one of several fillers. The filler bentonite can be combined with at least one conventional filler, such as kieselguhr, for example.

Another preferred illustrative embodiment of the wet running friction lining is characterized in that the wet running friction lining comprises a plurality of layers, of which at least one contains bentonite as a filler. If the wet running friction lining comprises a bottom layer and a top layer, the top layer preferably contains bentonite. The bottom layer then preferably does not contain any bentonite.

Another preferred illustrative embodiment of the wet running friction lining is characterized in that the bentonite contains montmorillonite as the main component. The bentonite based on a montmorillonite has proven particularly advantageous in tests and studies carried out in the context of the present disclosure.

Another preferred illustrative embodiment of the wet running friction lining is characterized in that the wet running friction lining contains at least one bottom layer and at least one top layer, which contains bentonite. The bottom layer is advantageously reinforced with fibers. The fibers are carbon fibers, for example. As an alternative or in addition, the bottom layer can advantageously contain aramid fibers. The top layer preferably contains no reinforcing fibers.

Another preferred illustrative embodiment of the wet running friction lining is characterized in that the top layer contains aramid and/or linters. The aramid is preferably embedded in the plastics matrix of the top layer. Linters is the term used to refer to relatively long seed fibers of cotton.

Another preferred illustrative embodiment of the wet running friction lining is characterized in that the bottom layer contains aramid, diatomaceous earths, linters and/or fibers, in particular carbon fibers. To form the plastics matrix, a synthetic resin is advantageously used. The synthetic resin is a phenolic resin, for example.

Another preferred illustrative embodiment of the wet running friction lining is characterized in that the wet running friction lining is a paper lining. Paper linings are produced in the same way as or in a manner similar to paper. In the production of paper linings, a paper web is first of all produced, for example. The paper linings can be cut out from the paper web.

The disclosure also optionally relates to a friction lining material for the production of a wet running friction lining described above. The friction lining material can be handled separately.

The disclosure furthermore relates to a friction plate with at least one wet running friction lining described above. The friction plate preferably comprises a lining carrier, on which at least one wet running friction lining described above is secured. Two wet running friction linings described above are preferably secured on the lining carrier. The wet running friction linings are preferably connected materially, e.g. by adhesive bonding, to the lining carrier. Furthermore, the wet running friction linings can be riveted to the lining carrier.

The disclosure also optionally relates to a wet running multiplate clutch with at least one friction plate described above. The wet running multiplate clutch is preferably used in the automotive sector.

BRIEF SUMMARY OF THE DRAWINGS

Further advantages, features and details of the disclosure will become apparent from the following description, in which various illustrative embodiments are described in detail with reference to the drawing, in which.

DETAILED DESCRIPTION

Figure 1:
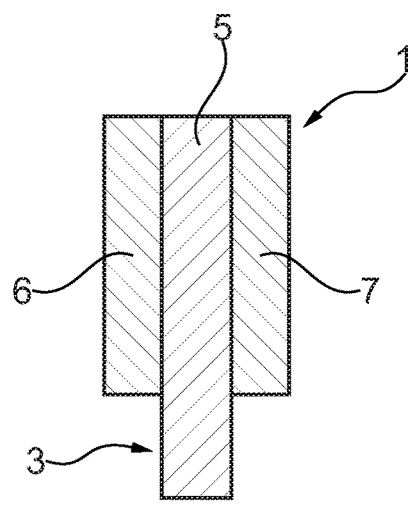
FIG. 1 shows a highly simplified illustration of a lining carrier according to an embodiment of the disclosure with two wet running friction linings in cross section.

A wet running clutch part 1 with a lining carrier 3 is illustrated in highly simplified form in cross section in FIG. 1. The lining carrier 3 comprises a main body 5, which has essentially the form of circular-ring-shaped disk with a rectangular ring cross section.

Two wet running friction linings 6, 7 are secured on the main body 5. The wet running friction linings 6, 7 likewise have the form of circular-ring-shaped disks with a rectangular ring cross section. The wet running friction linings 6, 7 have the same outside diameter as the main body 5 of the lining carrier 3. The lining carrier 3 has a smaller inside diameter than the wet running friction linings 6, 7.

The wet running clutch part 1 is an inner plate of a multiplate clutch, for example. To form a connection for conjoint rotation with an inner plate carrier of the multiplate clutch, the lining carrier 3 has internal toothing radially on the inside, for example.

Figure 2:
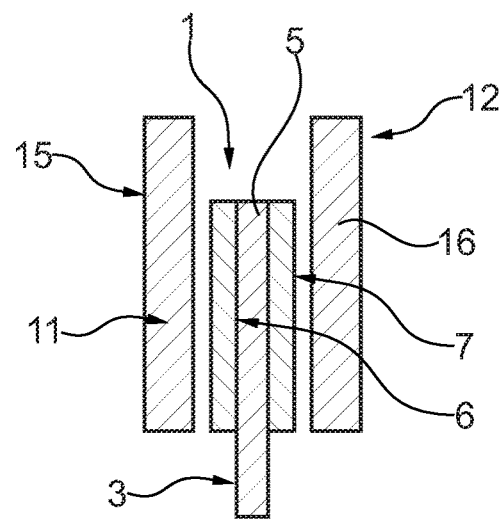
FIG. 2 shows an arrangement of the lining carrier with the wet running friction linings from FIG. 1 between two mating clutch parts made from a steel material.

In FIG. 2, the wet running clutch part 1 from FIG. 1 is arranged between two wet running mating clutch parts 11, 12. The two mating clutch parts 11, 12 each have a main body 15, 16 in the form of a circular-ring-shaped disk with a rectangular ring cross section.

An inside diameter of the main bodies 15, 16 of the mating clutch parts 11, 12 is the same as the inside diameter of the wet running friction linings 6, 7 in the lining carrier 3. However, the mating clutch parts 11, 12 have a larger outside diameter than the lining carrier 3 with the wet running friction linings 6, 7.

The mating clutch parts 11, 12 are, for example, outer plates of the multiplate clutch described above. To form a connection for conjoint rotation with an outer plate carrier, the mating clutch parts 11, 12 are advantageously provided radially on the outside with external toothing.

The wet running friction linings 6, 7 on the lining carrier 3 are formed from a wet running friction lining material. The lining carrier 3 is formed from a steel material. The mating clutch parts 11, 12 are likewise formed from a steel material.

Figure 3:
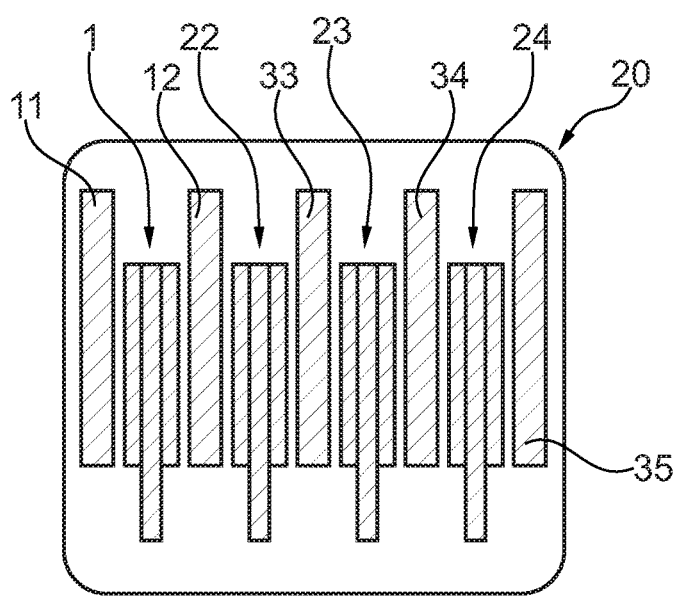
FIG. 3 shows a simplified illustration of a multiplate pack with wet running clutch parts and with wet running mating clutch parts made from a steel material.

A multiplate pack 20 of a multiplate clutch is illustrated in simplified form in FIG. 3. In addition to the wet running clutch part 1, the multiplate pack 20 comprises three further wet running clutch parts 22, 23 and 24. The wet running clutch parts 22 to 24 are embodied in the same way as the wet running clutch part 1. The wet running clutch parts 1, 22 to 24 form inner plates in the multiplate pack 20.

In addition to the mating clutch parts 11, 12 from FIG. 2, the multiplate pack 20 furthermore comprises three further wet running mating clutch parts 33, 34, 35. The wet running clutch parts 1, 22 to 24 are arranged alternately with the wet running mating clutch parts 11, 12, 33 to 35.

The mating clutch parts 11, 12 and 33 to 35 form outer plates of the multiplate pack 20. Here, mating clutch part 11 forms an end plate of the multiplate pack 20, said end plate being on the left in FIG. 3. Similarly, the mating clutch part 35 arranged on the right in FIG. 3 forms a second end plate of the multiplate pack 20. The wet running clutch parts 1, 22 to 24 are each arranged between two mating clutch parts 11, 12; 33, 34; 34, 35.

The wet running friction linings 6, 7 each comprise a bottom layer, which is also referred to as an underlayer, and a top layer, which is also referred to as an overlayer. The bottom layer is composed of aramid, diatomaceous earths, linters, carbon fibers and resin, for example. The top layer is composed of aramid, bentonite, linters and resin, for example.

The bentonite is used as a filler only in the top layer. The bentonite used is preferably a chemically modified sheet silicate based on montmorillonite with the abbreviation EXM 1936. This is a white powder with a bulk density of about one hundred and forty four grams per liter.

LIST OF REFERENCE SIGNS

1 wet running clutch part
3 lining carrier
5 main body
6 wet running friction lining
7 wet running friction lining
11 mating clutch part
12 mating clutch part
15 main body
16 main body
20 multiplate pack
22 wet running clutch part
23 wet running clutch part
24 wet running clutch part
33 mating clutch part
34 mating clutch part
35 mating clutch part

What is claimed is:

1. A wet running friction lining comprising:
    a top layer including a plastics matrix containing bentonite as a filler; and
    a bottom layer including a plastics matrix not containing any bentonite,
    wherein the top layer does not include any reinforcing fibers.

2. The wet running friction lining as recited in claim 1 wherein the bentonite is the only filler of the top layer.

3. The wet running friction lining as recited in claim 1 wherein the top layer contains at least one other filler.

4. The wet running friction lining as recited in claim 3 wherein the at least one other filler includes kieselguhr.

5. The wet running friction lining as recited in claim 1 wherein the bentonite contains montmorillonite.

6. The wet running friction lining as recited in claim 5 wherein the montmorillonite is the main component of the bentonite.

7. The wet running friction lining as recited in claim 1 wherein the bottom layer contains aramid, diatomaceous earths, linters and/or fibers.

8. The wet running friction lining as recited in claim 7 wherein the bottom layer includes fibers, the fibers being carbon fibers.

9. The wet running friction lining as recited in claim 1 the wet running friction lining is a paper lining.

10. The wet running friction lining as recited in claim 1 wherein the bentonite is a white powder with a bulk density of about one hundred and forty four grams per liter.

11. The wet running friction lining as recited in claim 1 wherein the bentonite is a sheet silicate having a flaky structure.

12. A method of forming a wet running friction lining comprising:
   forming the wet running friction lining to include a top layer including a plastics matrix containing bentonite as a filler and a bottom layer including a plastics matrix not containing any bentonite,
   wherein the top layer does not include any reinforcing fibers.

13. The method as recited in claim 12 wherein the forming of the wet running friction lining comprises:
   producing a web of wet running friction material; and
   cutting the wet running friction lining from the web.

* * * * *